Jan. 12, 1954

R. R. ARMSTRONG ET AL 2,665,582

METHOD OF TESTING CORD FABRIC

Filed Jan. 21, 1950

Inventors
ROBERT R. ARMSTRONG
AND
BURTON M. WOLF
By
Ely & Frye
Attorneys

Jan. 12, 1954   R. R. ARMSTRONG ET AL   2,665,582
METHOD OF TESTING CORD FABRIC

Filed Jan. 21, 1950   4 Sheets-Sheet 4

Inventors
ROBERT R. ARMSTRONG
AND
BURTON M. WOLF
By Ely & Frye
Attorneys

Patented Jan. 12, 1954

2,665,582

UNITED STATES PATENT OFFICE 2,665,582

METHOD OF TESTING CORD FABRIC

Robert R. Armstrong, Akron, and Burton M. Wolf, Wadsworth, Ohio, assignors to The Firestone Tire & Rubber Company, Akron, Ohio, a corporation of Ohio Application January 21, 1950, Serial No. 139,938

4 Claims. (Cl. 73—159)

This invention relates to a method of testing cord tire fabric, and it involves devising a test sample of novel construction and testing such samples, whereby the fatigue characteristics of the cords of the sample may be accurately determined under conditions simulating the compressive force to which the cords would be subjected in a tire in service.

Heretofore, cord testing for cord tires has usually subjected the cords to axial tension or stretching force. In some cases in the prior art the cords have been subjected to alternate axial tension and compression until the cords become fatigued to failure.

The results obtained by the testing methods previous to the present invention have not been entirely satisfactory because they did not consistently evaluate the friction and flexing characteristics of the cords tested relative to their ability to resist loss of tensile strength in tire service. Applicants have discovered that a substantial improvement in such evaluation results when the cords are kept free of axial tension but repetitiously go through cycles of zero axial stress to a substantial axial compression and back to zero. The loss of tensile strength of a rayon cord in a tire in service is due, to a large extent, to the chafing of adjacent filaments in the plies of the cords. The chafing action of these filaments against each other occurs when the cords of a tire are subjected to axial compression in the portion of the tire in contact with the ground and in the portion of the tire tread, shoulders and sidewall immediately adjacent the ground contacting area, at which time and in which area the filaments buckle and separate to some extent, but are again drawn into close contact as the cords are subjected to an axial realignment by the force of the tire inflation pressure as the cords move out of the above-mentioned areas.

An important feature of the present invention is the avoidance of substantially all longitudinal tension on the cords during the flexing portion of the test. It has been found that in flex testing the cords, by alternately subjecting them to tension and compression, the test results do not dependably correlate the values obtained in the laboratory with the values determined by road testing or service in actual use. It is thought that the testing of cords through a tensioning phase makes the results undependable because the filaments of the cords are too severely strained and the weaker ones become completely ruptured, upon only slight deterioration of total cord tensile strength. This successively throws longitudinal tensile strain on the unbroken filaments so that the test result becomes more a test of tensile strength than a test of the ability of the filaments to resist the deteriorating effect of chafing.

Another important feature of the invention is the method of testing wherein the deterioration of the cords being tested is stopped short of destruction and within a predetermined range of loss of tensile strength thereby leaving ample tensile strength remaining in the cords so that they may be separated from the rubber of the test sample without further injury to the cords, and thereafter subjected to a tensile strength test to determine the degree of deterioration due to flexing under compression.

A principal object of the invention is to provide a cord tire fabric test sample of such construction as will make possible the flexing of tire fabric cords periodically while subjected to compressive forces and substantially free of tension, in simulation of the forces imposed upon such cords in use in a pneumatic tire.

A more specific object is to achieve the aforementioned results by providing a test sample having associated therein a layer of relatively inextensible wire cables and a layer of cord tire fabric, the latter to be tested, said layers being embedded in spaced relation in vulcanized rubber compositions.

Figure 1:
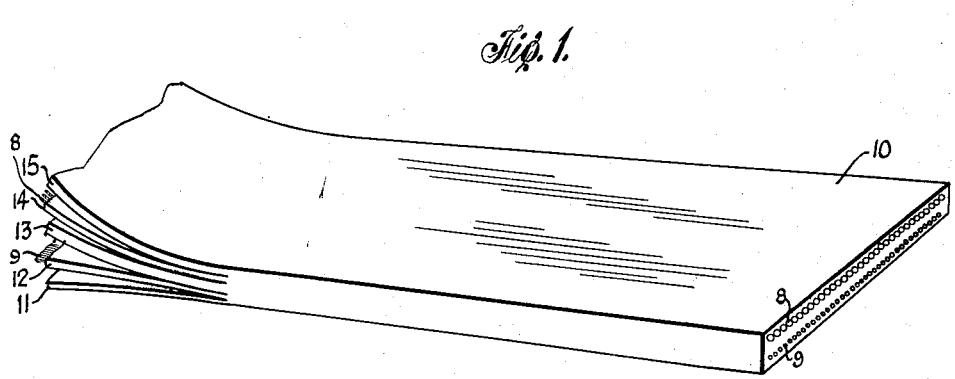
Figure 1 is a perspective view of a portion of assembled test material before it is molded and showing the layers of the assembly separated at one end of the assembly for better identification.

Referring to Figure 1 of the drawings there is shown a portion of a small slab 10 of test material from which test samples will later be cut. The construction of the test material will be best understood if described concurrently with the process by which it is made.

A ply or layer of cord tire fabric to be tested is incorporated into a test sample by first being rubberized in the usual manner of impregnating, skim-coating or calendering such fabric. Preferably a thin rubber coat is applied to both sides of the fabric. In similar manner a ply or layer of closely spaced parallel small wire cables are rubberized by applying a thin coat of rubber to both sides of the layer of wire cables.

Slab 10, of Figure 1, is a plied-up assembly. The first laminae is a bottom layer of rubber 11 which, for example, may be .025" thick. Next a layer or sheet 12 of the rubberized cord fabric to be tested is laid on layer 11. Any tension in the cords 9, imported during the calendering operation, will be relieved when the test sample of cords is cut from the roll of calendered cord fabric. As an example of the tire cords to be tested, 2200/2 rayon cords 9 may be employed, but it is to be understood that the invention is not limited to testing rayon as it is equally useful for testing nylon or cotton cords or fabrics as well as other textiles. Layer 12 may be .050" thick. Next a second layer of rubber 13, for example, approximately .100" thick is superimposed upon the previous layers. Fourth, a layer of rubberized wire cables 14 of overall thickness of .075", to continue the example, is laid on layer 13. The wire cables 8 of layer 14 are flexible and substantially inextensible. Next a fifth and top layer 15 of rubber which, for example, may be .050" thick may be applied to the assembly. The layers 11, 12, 13, 14 and 15 are cut to predetermined size and shape and are stitched or pressed together. If the unvulcanized rubber of these layers has lost its tack a rubber solvent or cement may be used to provide an adhesive surface as will be understood by those familiar with the art. The fabric cords and wire cables extend longitudinally of the slab 10. Care is exercised to have the cords and cables extend in a straight line free of buckles or waves.

Figure 2:
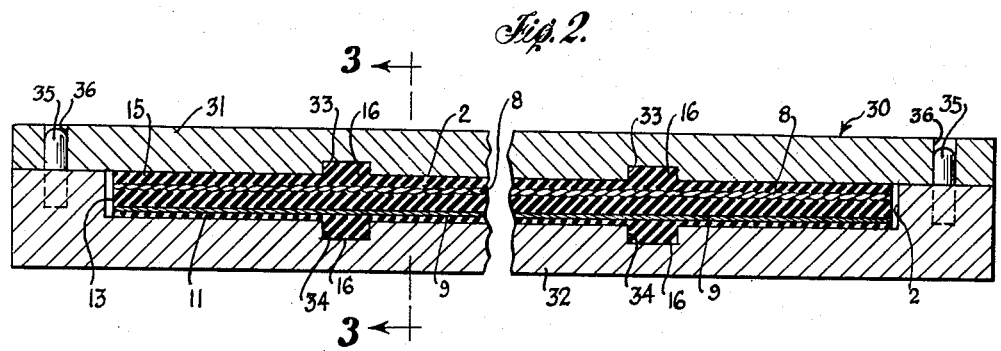
Figure 2 is a longitudinal section of a mold with assembled test material molded and vulcanized therein.
Figure 3:
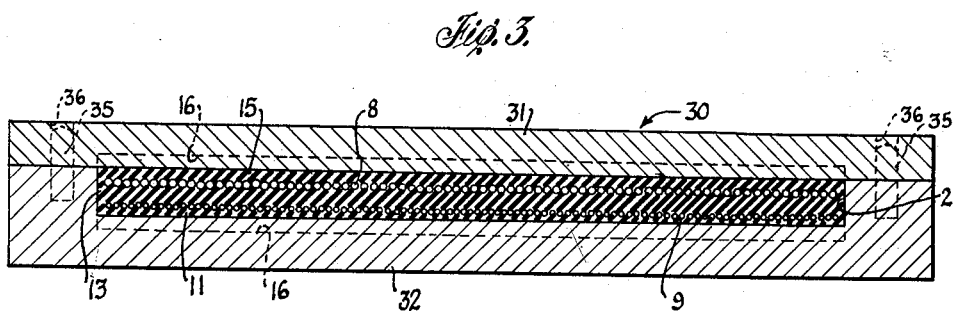
Figure 3 is a section on line 3—3 of Figure 2.

The slab 10 is placed in a mold 30, see Figures 2 and 3, for vulcanization of the rubber about the cords and cables and for imparting a predetermined shape and density to the slab. The mold 30 comprises, in combination, separable lid and bottom members having registering recesses therein which together constitute a mold cavity 2 conforming in shape to the desired exterior contour of the finished slab. The lid 31 and bottom 32 of mold 30 have transversely extending grooves 33, 33 and 34, 34, respectively, formed therein. Dowel pins 35 rise from the bottom half to enter dowel holes 36 in the lid 31 in the usual manner of such molds. The mold is adapted for use with a platen press and is ordinarily hot when the assembled slab 10 is laid in the mold. When the lid is removed from the bottom of the mold it is laid so that the cavity faces upwardly. Preparatory to laying the slab 10 in the bottom cavity of the mold, gum strips of a size and shape to substantially fill grooves 33, 33 and 34, 34 are laid therein, where, due to the mold being hot, these strips adhere to the metal sufficiently to remain in position during the necessary manipulation of the mold to place it in a curing press. The overall length of the green slab 10 is preferably cut to approximately 1/8" less than the length of the cavity of mold 30. This provides a slight movement of rubber stock longitudinally of the cords of the slab during its molding. This flow of rubber prevents buckling of the cords and tends to straighten them out. The slab 10 in its green condition is laid in the bottom mold cavity and the mold lid placed in position, after which the mold is placed between the platens of a vulcanizing press and is subjected to heat and pressure until the slab 10 is molded and the rubber vulcanized, leaving the ends of the wire cables and test cords slightly short of the molded slab as illustrated in Figure 2.

Figure 4:
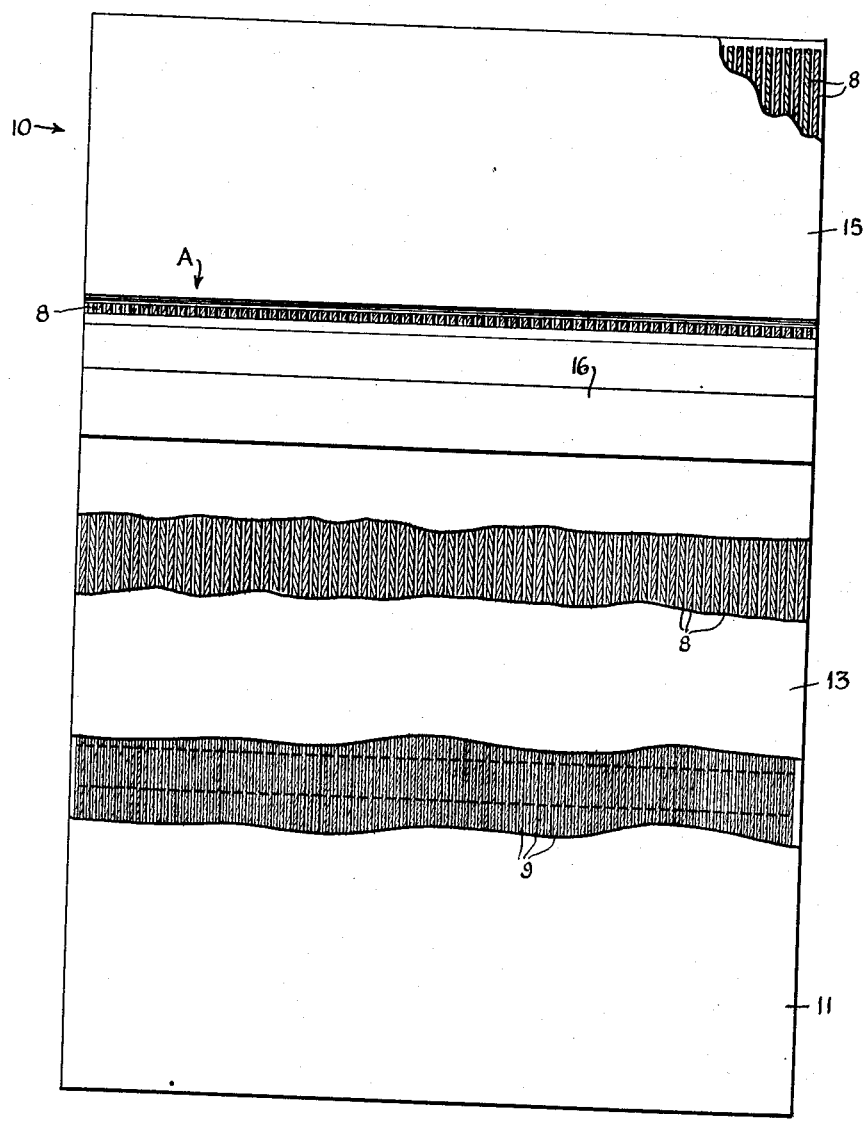
Figure 4 is a plan view of the molded and vulcanized test material showing the plies or layers stepped-down disclosing wire and cord cable elements of the assembly.
Figure 5:
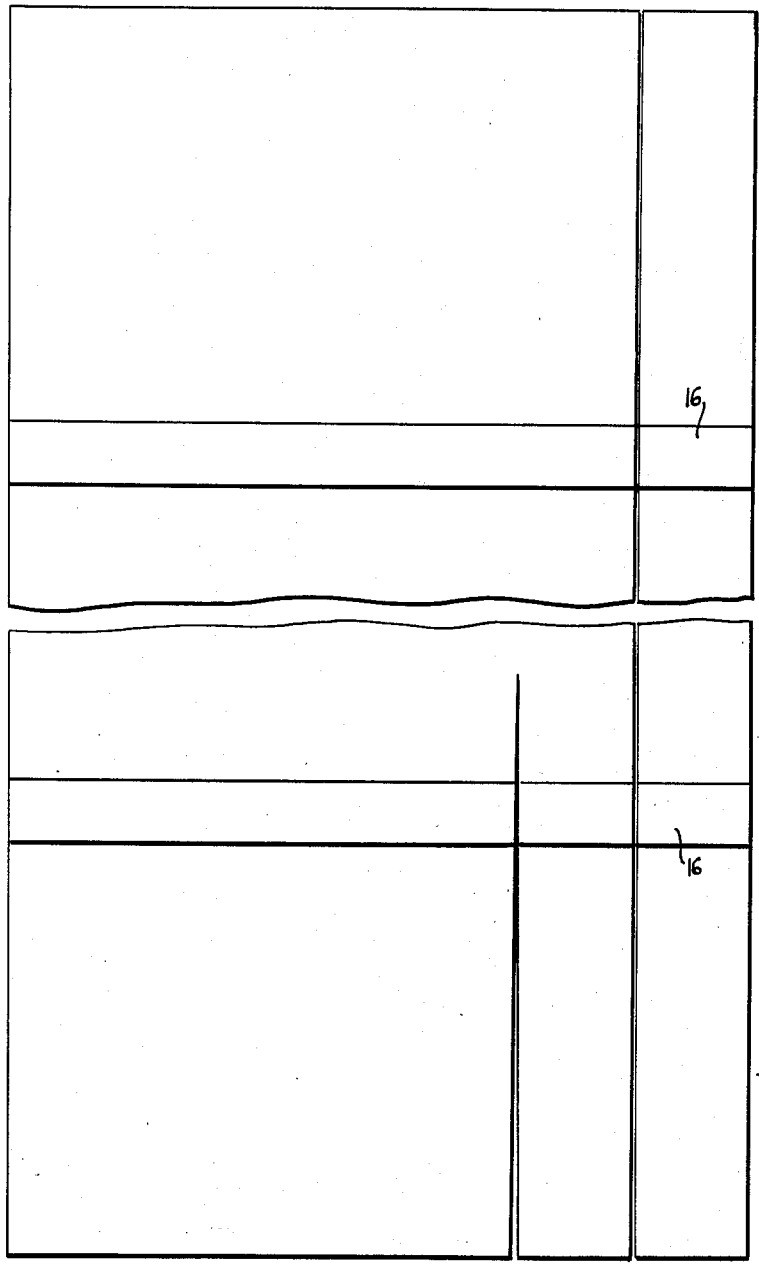
Figure 5 illustrates the manner in which a test sample embodying the present invention is cut from the molded and vulcanized test material.

After vulcanization the slab is removed from the mold and is cut into test samples 20 by cutting between the wires and cords. To facilitate starting the cut the rubber over the wires in the molded slab may be buffed away exposing the wire as at A in Figure 4. Samples 20 are cut approximately 3/4" wide. It will be seen, by reference to Figures 2, 3 and 4, that narrow raised ribs 16, which are rectangular in cross-section, are disposed on the samples near the ends thereof. Also, it will be seen, by reference to the drawings, that the inextensible wires 8 overlie the cords 9 and that the wires and cords are separated by the rubber of layer 13. The thickness of the rubber separating the cords and the wire is a factor in the regulation of the severity of the compressive force exerted on the cords as will be explained hereinafter.

In practicing the invention, the sample 20 is looped over a roller 7 of a suitable testing machine, said sample having the embedded textile cords 9 between the roller 7 and the cables 8. Said testing machine having means for subjecting sample 20 to a predetermined pressure against said roller and further means for repetitively drawing a portion of the extent of the sample over roller 7 in an arcuate path and in a reciprocal motion. Since testing machines with provision for reciprocal movements of samples are well known to the art and are not claimed in this application, a detailed description of the mechanism is considered to be unnecessary.

Figure 6:
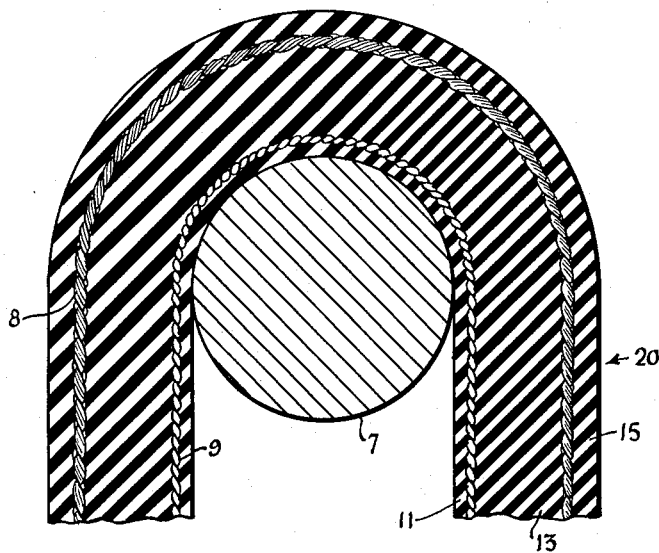
Figure 6 is an enlarged longitudinal sectional view of the test sample taken through a flexed portion thereof and an antifriction roller over which the test sample is drawn in an arcuate path.

By reference to Figure 6 it will be seen that sample 20 approaches and leaves roller 7 in a straight line and that the cords 9 pass over roller 7 in an arcuate path removed from the surface of said roller by the thickness of rubber underlying said cord. It will also be seen that the wire cables 8 also pass over roller 7 in an arcuate path removed from the surface of said roller by the thickness of rubber and fabric underlying said cables. The arcs through which the cables and cords travel have a common axis, namely the axis of the roller 7. It is important to note that the pull on sample 20 required to draw it toward roller 7 will not result in imparting longitudinal tension to the cords 9 since the inextensible wire cables 8 will take the load. As the surface of the sample progressively reaches the point of tangency between it and the roller 7 the same length of wire cables and textile cord will move into said arcuate path. During the arcuate travel the wire cables travel a greater distance than the cord since the distance traveled is in direct proportion to the radii of the arcs traveled. The inextensible characteristic of the wire cables will not permit longitudinal stretch in sample 20 and the neutral axis of the sample passing over roller 7 must fall within the layer of inextensible wire cables. That portion of the sample which lies radially inwardly of the neutral axis is subjected to longitudinal compression. The amount of longitudinal compression to which the cords 9 of the samples 20 is subject may be controlled, within workable limits, by the thickness of stock placed between the wire cables and the cords. As explained above, the cords being tested are drawn into their arcuate path free of tension or compression and upon entry into the arcuate path the cords are compressed longitudinally thus exerting a separating and opening force upon the filaments of the cords. On leaving the said arcuate path the cords return to their zero stress condition. As these changes are rapidly repeated over a period of time the chafing of the filaments progressively deteriorates the filaments and reduces the tensile strength of the cord of which they are a part.

It has been found that in order to obtain an arcuate comparison of the flex life characteristics of different cords relative to their tensile loss resistance characteristics in tire service that the cords being tested must not be reduced in tensile strength beyond a point that they will become further weakened by the necessary stress or pull to which they are subjected in their removal from the test sample rubber preparatory to measuring by break testing the residual tensile strength of the cords. For this and other reasons the cords are not run to failure. Additionally, it has been found that only the cords from the center of the sample should be considered in evaluating the merits of the cords. The cords from the edges of the sample are not subject to absolutely uniform compressive forces due to the distortion of the edge of the sample at the time of compression. In practice the performance of cords tested by the above method is compared to previous standards, established by similarly testing cords whose ability to resist tensile loss has been observed in actual tire service. It has been found that the present samples and method of testing accurately and uniformly evaluates the relative merits of such cords in respect to their ability to resist tensile loss in a tire.

Figure 7:
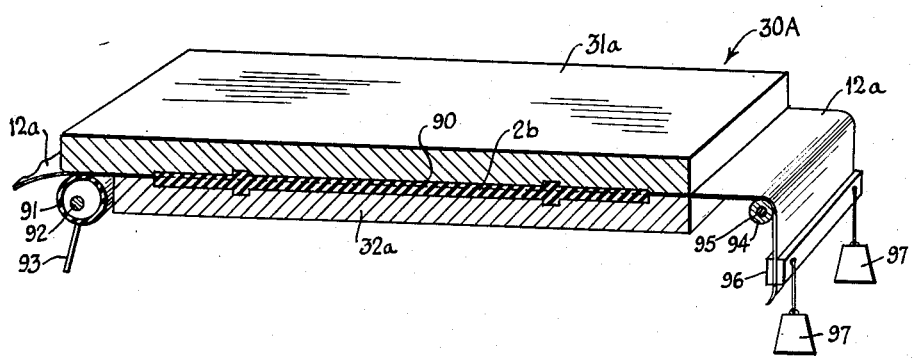
Figure 7 is a perspective view showing another embodiment of a curing mold with means for imparting a determinate tension on the cords during molding of the test material.

Another embodiment of a mold adapted to vulcanizing the test samples is shown in Figure 7. This mold provides means for imparting sufficient longitudinal stress to the cords of a slab such as 10 to avoid any possibility of the cords 9 losing their straight direction during molding. To this end a mold 30A having a cavity 2b corresponding to the cavity of mold 30, except cavity 2b is reduced in depth at its end portions and extends the length of the mold. The depth of cavity 2b at its shallow ends is approximately equal to the diameter of the cords to be tested. In laying up the green slab for mold 30A, layer 12 of Figure 1 is extended beyond the ends of layers 11, 13, 14 and 15 to provide portions 12a of layer 12 which project beyond the ends of the mold. It will be noted that a lid 31a, of mold 30A, has a shallow recess 90 which forms a part of the mold cavity. Recess 90 corresponds in depth to the thickness of rubber under the cords to permit the cords to extend straight out of the mold. Lid 31a extends beyond one end of the bottom 32a of mold 30A and an eccentric roll 91, mounted on a shaft 92, is disposed under this extension, shaft 92 being attached to the bottom 32a in any suitable manner, thus, in combination with the undersurface of lid 31a providing an eccentric clamp for the cords of the sample material. Roll 91 is provided with a handle 93 to facilitate turning of the roll. An idler roller 94, on a shaft 95, is disposed at, and spaced a distance from, the other end of the mold 30A. A slab 10, especially built by extending the cord layer 12, as indicated above, is laid in mold 30A with the extended cords overlying rolls 91 and 94. After lid 31a has been placed in operative position the eccentric roll 91 is turned on its shaft and clamps the cords overlying it against the bottom of the lid. A clamp identified generally by reference numeral 96 is attached to the ends of the cords which overlie roll 94. Clamp 96 may carry removable weights 97, and in practice weights are selected according to the amount of pull found desirable for the cords. Such pull will be the minimum which may be used and insure that the cords will not become wavy during molding and vulcanization. After the molding of said material and its removal from the mold, the projecting cords are cut off and test samples cut from the molded assembly and tested in the same manner as samples 20 described above.

Modifications may be resorted to without departing from the spirit of the invention or the scope of the appended claims.

What is claimed is:

1. The method of testing tire cord fabric which comprises embedding a layer of cord elements of said fabric free of axial tension and a layer of inextensible parallel wires in spaced planes in an elongated body of rubber-like material to form a test sample, repetitiously passing a reach of said sample into and out of an arcuate path with the wire layer outermost while maintaining the radial inner surface of the arcuate portion of the test sample at a fixed radius, whereby the cord test elements are maintained under compression in said arcuate path free of longitudinal tension in the remainder of said sample beyond said arcuate path.

2. The method of testing tire cords which comprises embedding in parallel spaced planes a layer of cords to be tested and a layer of wire cables in or adjacent the surface of a sheet of rubber to form an elongated test specimen, said cords being free of axial tension, repetitiously passing reaches of said specimen in a straight line to and arcuately about a rotatable bar with the wire cables outermost, pressing said bar with determinate force against the radial inward surface of the progressively arcuated portion of said specimen, said cables passing in a line radially outwardly from said cords in the arcuate travel of the specimen, whereby to subject the cords alternately to compression and zero compression without subjecting the cords to longitudinal tension.

3. The method of fatigue testing cord fabric under conditions simulating the conditions to which the material would be subjected in the service for which it is intended, comprising embedding a layer of the cord fabric to be tested and a layer of substantially inextensible material in spaced parallel planes in raw rubber, said cords being substantially free of axial tension, vulcanizing the rubber and cutting therefrom elongated test pieces with said cords extending longitudinally thereof and normally having zero longitudinal stress, oscillating a portion of each test piece in an arcuate path over an idler roller pressed against the fabric side of the test piece, said cords traveling in a straight line to and from said arcuate path, whereby the cords cyclically pass from zero compression to maximum compression and are free of longitudinal tension during said test.

4. The method of fatigue testing cord fabric under conditions simulating the conditions to which the material would be subjected in the service for which it is intended, comprising embedding a layer of the cord fabric to be tested and a layer of substantially inextensible material in spaced parallel planes in raw rubber, said cords being substantially free of axial tension, vulcanizing the rubber and cutting therefrom elongated test pieces with said cords extending longitudinally thereof and normally having zero longitudinal stress, oscillating a portion of each test piece in an arcuate path over an idler roller pressed against the fabric side of the test piece, said cords traveling in a straight line to and from said arcuate path a predetermined number of times sufficient to reduce the tensile strength of said cords but not to a point where the cords will be further injured by the necessary stress to which they will be subjected when they are removed from the rubber; said cords cyclically passing from zero compression to maximum compression and being free of longitudinal tension during said test, removing the cords from said sample and measuring their tensile strength.

ROBERT R. ARMSTRONG.
BURTON M. WOLF.

References Cited in the file of this patent

UNITED STATES PATENTS

| Number | Name | Date |
|---|---|---|
| 989,967 | Headson | Apr. 18, 1911 |
| 1,347,291 | Price | July 20, 1920 |
| 1,355,534 | Buchmann | Oct. 12, 1920 |
| 1,917,929 | Duffy | July 11, 1933 |
| 1,939,878 | Davidson | Dec. 19, 1933 |
| 2,008,353 | Geare | July 16, 1935 |
| 2,048,314 | Allen | July 21, 1936 |
| 2,107,013 | Morgan | Feb. 1, 1938 |
| 2,256,153 | Riehl | Sept. 16, 1941 |
| 2,456,922 | Cogovan | Dec. 21, 1948 |
| 2,541,506 | Cuthbertson et al. | Feb. 13, 1951 |